Jan. 9, 1934.  A. J. DOTTERWEICH  1,942,808
WATER SOFTENING APPARATUS
Filed Oct. 2, 1929
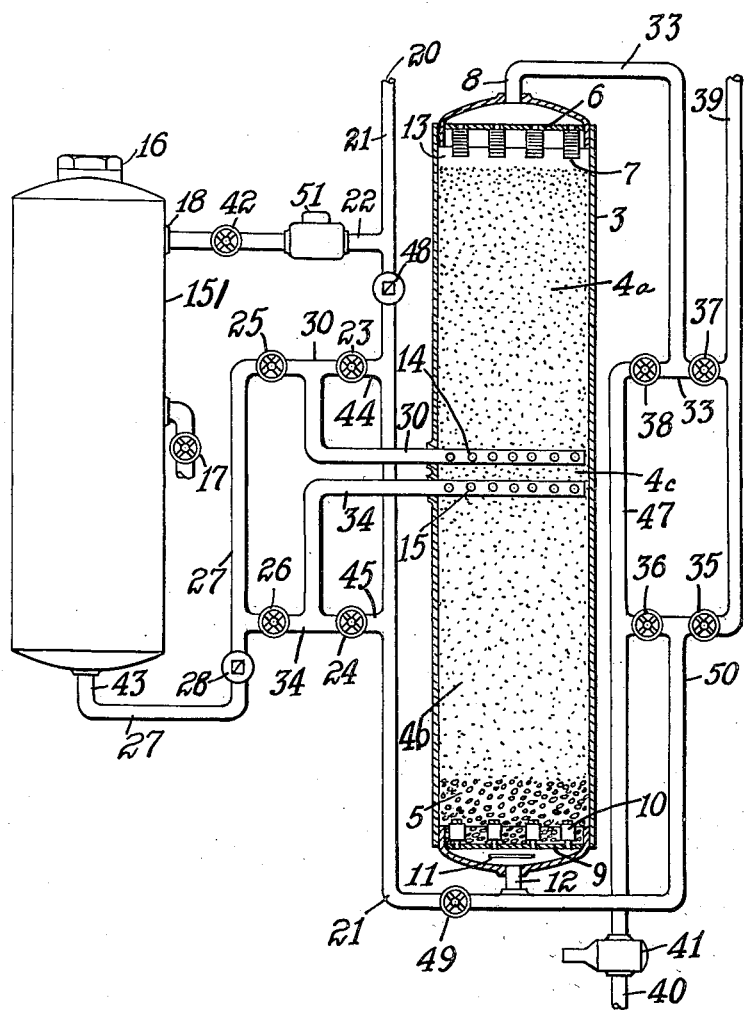
Andrew J. Dotterweich
INVENTOR Patented Jan. 9, 1934

1,942,808

UNITED STATES PATENT OFFICE 1,942,808

WATER SOFTENING APPARATUS

Andrew J. Dotterweich, Pittsburgh, Pa., assignor to Automatic Water Softener Company, Pittsburgh, Pa., a corporation of Delaware Application October 2, 1929. Serial No. 396,672

16 Claims. (Cl. 210—24)

This invention relates to a complete water softening apparatus of the type employing a zeolite or similar material as a means to soften water and which is adapted to be regenerated at intervals.

It is among the objects of this invention to provide a water softening apparatus which is capable of continuously delivering water from a single container without interruption during the periods of regeneration.

Another object of this invention is to provide a water softening apparatus which is capable of delivering softened water from one section or part of the apparatus while the other section is being regenerated.

Another object of the invention is to provide a water softening apparatus which is capable of delivering softened water to a point of use at a rate of flow which exceeds the maximum rate of flow of water permissible thru the bed of softening material of a conventional water softener.

Another object of this invention is to provide a water softening apparatus which is of a simple construction, efficient in operation, adapted to be regenerated in a minimum period of time, and requiring a minimum floor space. An apparatus suitable for this invention comprises a tank containing a bed of zeolite, two inlets being provided approximately midway in the bed and other connections being provided at opposite ends of the tank. The control means for this apparatus comprises piping and valves so arranged that water may be directed at will either through the entire length of the zeolite bed or in divided paths through sections of the bed. For purpose of illustration a pressure salt is used from which brine may be forced through a section of the zeolite bed for regenerating purposes by flow of water into the salt tank. The control means permit to pass water to be softened through one section of the bed to use, while another section of the bed is being regenerated.

The manner in which the above mentioned as well as other objects of the invention are achieved will become more apparent from a consideration of the accompanying drawing in which like reference characters designate like parts and in which the single figure is a sectional elevational view of a water softening unit together with equipment embodying the principles of this invention.

In the specifications of this invention, reference is made to a consideration of the zeolite within the container as being a composition of two active beds, one disposed on the other, rather than as a single bed as the drawing may apparently indicate. This consideration is for reason that the flow of fluids thru one bed of zeolite is separate and distinct from the flow of fluids thru the other bed, except where the flow of a fluid in a specific method of operation, is from one end of the container towards the other end.

In the following specifications, reference is made to the upper bed, indicated by the character 4a, as that part of the bed above the upper member 14 imbedded in the approximate central location of the zeolite bed, and the lower bed indicated by the character 4b, as that part of the bed below the lower member 15 imbedded in the approximate central location of the zeolite bed. Located within the space between the upper and lower centrally located members 14 and 15, a neutral space or inactive bed of zeolite separates the lower and upper beds, and is indicated by the character 4c.

Referring to the illustration, a container, indicated by numeral 3, has within it a divided zeolite bed 4a, 4b, 4c, disposed on the gravel bed 5, supported by plate 9.

In the upper end of the container 3, a plate 6 is equipped with suitably spaced strainer nozzles 7 which serve to assist in directing the flow of fluids towards and thru the plate 6. These nozzles 7 also retain within the container 3 such zeolite as may be apt to pass from the container thru connection 8 at the higher rates of flow.

Just below the plate 6 and above the zeolite bed, a freeboard space 13 of sufficient depth is provided for expansion or resetting of the lower zeolite bed 4b after a period of prolonged use as hereinafter described.

In the lower end of the container 3, nozzles 10 serve to assist in directing a uniform flow of fluids thru the zeolite bed 4b. Below plate 9, a baffle plate 11 acts to diffuse the flow of fluids passing to or from the container 3, thru the connection 12.

Thru inlet pipes 30 and 34, provision is made whereby separate fluids are introduced into the container 3 to the distributors 14 and 15 respectively positioned in an approximate central location of the zeolite bed for the purpose as hereinafter explained.

The tank 151, containing salt for several regenerations of the softening material, has a water inlet at 18, controlled by valve 42 and is connected by piping 22 to a source of supply 20 from piping 21. Disposed in the inlet line 22, a water meter 51, serves to measure the volume of salt solution displaced during the regeneration period.

The tank 151 is further provided with a concentrated salt solution outlet at 43 having connection by piping 27 thru the choke 28 with the nest of valves 23, 24, 25 and 26.

Leading from a source of water supply at 20, piping 21 has connection with the piping 22 leading to the salt tank 151, with piping 44 and 45 leading to the nest of valves 23, 24, 25 and 26 and with the lower end of the container 3 thru valve 49 and connection 12.

In the upper end of tank 151, provision is made by a removable cap 16 for placing therein at intervals enough salt to serve the requirements of the softener unit.

For purpose of replenishing the salt supply, valves 42, 25 and 26 are closed, the drain valve 17 opened and the cap 16 removed. After the tank 151 has drained to the level of valve 17, this valve 17 is closed, the salt charge placed in tank 15, valve 42 opened to permit water to fill tank 151. Valve 42 is then closed, the cap 16 replaced thus providing a means whereby the salt supply in the tank 151 can be replenished without causing an interruption in the flow of softened water.

The cycle of operation requires that regenerating solution must be applied to the bed of zeolite being regenerated from the distributor means adjacent such bed and accordingly for this purpose, provision is made by means of valves 23, 24, 25 and 26 to control or direct a flow of such fluid to one of the distributors 14 or 15 and to control or direct a flow of fresh water to the other.

For illustration, if a regenerating solution is being applied to the upper bed 4a, valves 24 and 25 are open and valves 23 and 26 are closed. This setting of these valves permits a concentrated solution of regenerating material to pass from the brine line 27 thru choke 28, piping 30 to the distributor 14 and upwardly thru the zeolite bed 4a, and from the container 3 thru the connection 8. The setting of these valves in that position also permits fresh water to pass from the supply pipe 21 thru piping 45, valve 24, piping 34 to the distributor 15 then also upwardly thru the zeolite bed 4a and from the container 3 thru the connection 8.

The cycle of operation also requires that the brine or regenerating solution shall be withdrawn from that end of the container adjacent the bed being regenerated and accordingly for this purpose, a provision is made by means of valves 35, 36, 37 and 38 to control or direct the flow of fluids from the container 3 to either a drain, a point of use or both as the case may be.

In the normal operation of this apparatus, at such times when water is passing to use or to a drain, there is a difference of static pressure within the container in accordance with the rate of flow of water being withdrawn, the range of such difference in pressure being a maximum at such times when the withdrawal of a fluid at a maximum rate of flow and at a minimum or zero when no water is passing from container 3.

In view of the above, a flow regulator or flow limiting valve 41 is disposed in the path of a fluid passing to the drain at 40 thru pipe 47. This flow regulator provides a means whereby the flow of a fluid to the drain is substantially at a constant or predetermined rate regardless of the pressure within the container, instead of being at various rates in accordance with the varying pressures in the container 3. The flow regulator 41 has been shown diagrammatically in the drawing, this being a type of equipment well known to those skilled in the art. By way of example, reference is made to the patent to Turner #1,715,801 issued June 4, 1929, which shows and describes a flow-regulating device suitable for my purposes.

Disposed in the path of the incoming water thru piping 21, a choke 48 provides a means whereby during the periods of regeneration, a volume of water from the supply pipe 21 is forced into the tank 151 thru pipe 22, meter 51, valve 42, resulting in the discharge of an equal volume of salt solution from the lower end of tank 151 thru connection 43.

Disposed in the brine line 27 leading from the connection 43 to the nest of valves 23, 24, 25 and 26 an adjustable choke 28 provides a means for controlling the rate of discharge of a concentrated salt solution from the tank 151.

For efficient regeneration of the softening means, it is preferred that a solution of regenerating material shall be applied in a diluted form and therefore during the period of regenerating one of the zeolite beds, while a concentrated salt solution is passing into the container 3 thru the adjacent inlet, at the same time, fresh water from the other inlet also passes in the direction of the bed being regenerated so that the combined flows from these inlets cause a salt solution of the desired concentration to pass thru the zeolite bed to the drain. The concentration of salt solution passing thru the zeolite bed is regulated by the opening or closing of the choke 28 to secure an increased or decreased concentration of the regenerating solution.

After a desired volume of regenerating material has passed into container 3, measured by the meter 51, a valve controlling the inlet of salt is closed and fresh water permitted to continue passing from the other or farther distributor to the drain until all the salt solution has been flushed out from the zeolite bed being regenerated.

This invention involves a means which shall at all times prevent a discharge of salt solution into the path of softened water leading to the point of use and accordingly provision is made whereby the rate of flow of a fluid from the softener to the drain shall at all times exceed the rate of flow of the salt solution passing into the container. This is accomplished by an adjustment in the setting of the flow regulator 41 so that its resistance is less than the choke 28, i. e. the resistance of the smallest cross section in the outlet piping to the drain must exceed the smallest cross section in the salt inlet piping to the container 3.

With such a provision, there will always be a flow from the farther central inlet in the direction towards the zeolite bed in connection with the drain rendering it impossible for a salt solution to pass in any direction other than towards the drain.

The particular construction illustrated provides for passing water downwardly thru the lower bed 4b. Therefore, after prolonged periods of softening, it is preferred that the bed shall be loosened or reset and therefore raw water from the source of supply at 20 is directed thru piping 21, valve 49, connection 12 into the container 3 and thence thru the zeolite beds 4b, 4c, 4a freeboard space 13, nozzles 7 to the outlet connection 8 and thence to a drain thru piping 33, valve 38, regulator 41 and piping 40, such flow being continued until the lower bed 4b has become loosened. During this operation valves 23, 24, 25, 26, 35, 36, 37, and 42 remain closed.

One method of operating this apparatus is as follows:—

Assuming that the upper bed 4a, is in the regenerated state and the lower bed 4b is about exhausted. Under these conditions, valves 42, 49, 25, 26, 23, 36, 37, and 38 are in a closed position while valves 24 and 35, are open, permitting the flow of water from the source of supply at 20, thru piping 21, choke 48, connection 45, valve 24, inlet 34, distributor 15, downwardly thru the zeolite bed 4b, gravel 5, strainer nozzles 10, connection 12, piping 50, valve 35 to use thru pipe 39.

To insure a continued flow of softened water to a point of use valves 37 and 23 are then opened permitting the water to pass from distributor 14 upwardly thru the upper bed 4a, freeboard space 13, strainer nozzles 7, thence from the container 3 thru connection 8, piping 33, valve 37, piping 39 to use.

Valve 35 is next closed, valve 49 opened and then valves 23 and 24 closed, in the order named. The present position of the valves causes water to flow from the source of supply at 20, thru piping 21, valve 49, connection 12 into the container 3 and thence upwardly thru nozzles 10, gravel 5, zeolite bed 4b, 4c and 4a, freeboard space 13, strainer nozzles 7, and thence from container 3 thru connection 8, piping 33, valve 37, piping 39 to point of use.

Passing of water upwardly thru the zeolite bed 4b, causes it to become well loosened if the flow to the point of use during this period is sufficient for this purpose as can be readily determined by some suitable means such as a flow meter inserted in the incoming water supply line. If little or no water is passing to the point of use during this bed loosening period, the valve 38, directing a flow to the drain at 40 can be opened just enough so that the sum total of the flow to use and to a drain will be at a rate of flow sufficient to properly loosen the bed and for a period of time which is proper in the judgment of the operator.

After the bed loosening operation, valve 23 is opened, valve 49 closed, valve 42 opened, valve 38 closed if it had been opened, and valves 36 and 26 opened in the order named.

With the valves so positioned, water from the source of supply at 20 passes thru piping 21, choke 48, connection 44, valve 23, inlet 30, distributor 14, upward thru the zeolite bed 4a, freeboard space 13, strainer nozzles 7 and thence from the container 3 thru connection 8, piping 33, valve 37 to the point of use. In addition, for the purpose of regenerating the lower bed, water passes from the source of supply piping 21, thru piping 22, meter 51, valve 42, connection 18 into the salt tank 151, thence forcing a concentrated salt solution from the tank 151 thru connection 43, piping 27, choke 28, valve 26, inlet 34, distributor 15 where at this point water from the inlet 14 combines with the salt solution from the inlet 15 and then this diluted solution passes downwardly thru the zeolite bed 4b, gravel 5, strainer nozzles 10, thence from the container 3 thru connection 12, piping 50, valve 36, flow control valve 41, thru piping 40 to the drain.

After a sufficient volume of regenerating material has passed into the container 3 for the above purpose, determined by some suitable means such as the water meter 51, valves 26 and 42 are closed, the other valves remaining positioned as in the period of salt application.

In the period of flushout, water passes from the source of supply, upwardly thru zeolite bed 4a, and to the point of use as in the preceding paragraph and also passes from the distributor 14 downwardly flushing out the brine from the zeolite bed 4a, thru the gravel bed 5, strainer nozzles 10 and from the container 3 thru connection 12, piping 50, valve 36, flow control valve 41 and piping 40 to drain.

Water is permitted to flush out the lower bed until commercially free of salt which is usually determined by a soap test, and then valve 36 closed to terminate regeneration of the lower bed and placing it in readiness to soften water on exhaustion of the upper bed.

Assuming that the upper bed is now exhausted, the bed loosening operation can be dispensed with as the flow through the upper bed 4a is continuously in an upward direction, valves 35 and 24 are opened, valves 23 and 37 closed and valves 38, 25 and 42 opened in the order named.

Water is now passing from the source of supply at 20 thru piping 21, choke 48, connection 45, valve 24, inlet 34, distributor 15 then downwardly thru zeolite bed 4b, gravel 5, strainer nozzles 10, then from container 3 thru connection 12, piping 50, valve 35, piping 39 to the point of use. Water is also passing from supply pipe 21 thru piping 22, water meter 51, valve 42, inlet 18 into tank 151 where a concentrated brine solution is forced from tank 151 thru outlet 43, piping 27, choke 28, valve 25, inlet 30 into the container 3, thence from the distributor 14 where water from the distributor 15 combines with the salt solution from the inlet 14 to form a diluted salt solution which passes upwardly thru the zeolite bed 4a, freeboard space 13, strainer nozzles 7 then from the container 3 thru the connection 8, piping 33, valve 38, piping 47, flow control valve 41, and piping 40 to drain.

After a sufficient charge of brine has been introduced into the container, valves 25 and 42 are closed and the other valves remain positioned as during the period of salt application.

In the flushout period, water passes from the source of supply, downwardly thru zeolite bed 4b and then to the point of use, also passing from the distributor 15 upwardly to flush out the brine solution from the upper bed 4a, then thru freeboard space 13, strainer nozzles 7, thence from container 3 thru connection 8, piping 33, valve 38, flow control valve 41 and piping 40 to drain.

In the foregoing suggested method of operation, the attention of an operator is required as each bed becomes exhausted. Such a plan of operation may be satisfactory in many instances, however, if preferred, a modified method of regeneration can be employed which will permit the regeneration of one zeolite bed immediately following the regeneration of the other bed without interrupting the supply of softened water and thus lengthen out the time intervals between the periods of the regeneration operations.

In substance, this modified plan provides for passing water to be softened thru one bed while the other is being regenerated, then change the flow of water to be softened so that it will pass thru the regenerated bed of zeolite while the exhausted bed is being regenerated and then finally, after both beds have been regenerated, the flow is directed to the lower inlet 12 of the container 3 thence upwardly thru the zeolite beds 4a, 4b and 4c and thence from the container 3 to point of use, thus securing the softening capacity of all zeolite within the container 3 before further attention is required for regeneration.

Quite frequently, it is desired that the rate of flow of softened water to a point of use shall exceed the rate of flow at which water is efficiently softened by passage through a bed of given area i. e. at rates of flow higher than a rate at which the zeolite will completely soften the water. In this instance, a modified plan of operation permits water to pass thru the zeolite beds at normal rates of flow, thereby resulting in a flow to use at an abnormal rate of flow equal to the combined flow through both beds. Such method of operation is as follows:—

With either one or both inlet valves 23 and 24 and both soft water valves 35 and 37 opened and all other valves closed, water can pass into the container 3 thru either one or both of the inlet connections 30 or 34, thence from either one or both of the distributors 14 and 15 and thru divided paths, one path leading upwardly thru the zeolite bed 4a, thence from the container 3 thru connection 8, piping 33 to valve 37, the other path leading downwardly thru zeolite bed 4b, thence from the container 3 thru connection 12, piping 50 to valve 35 where the softened water from both paths combines in passing thru piping 39 to use. This flow thru both zeolite beds during the softening period thus provides a means whereby the rate of flow to use can be at a rate equal to the sum total of the maximum rates of flow thru the separate beds of zeolite.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art will be able to take advantage of the principles involved in the disclosure by apparatus, use and methods of procedure perhaps dissimilar in appearance and arrangement but nevertheless within the scope of the invention and therefore desire to comprehend within my invention such modifications as may be necessary to adapt it to varying conditions and uses.

I claim:—

1. A water softener having, in combination with a bed of water-softening material, means for introducing water thereto, a plurality of outlets arranged relative to the water-inlet means so as to cause the flow of water to the outlets in separate paths through different sections of the bed, means for discharging the flow from said outlets to service, means for effecting discharge of the flow through a selected section of the bed otherwise than to service, and means for introducing regenerating solution into such selected section.

2. A water softener having, in combination with a bed of water-softening material, means for introducing water thereto, a plurality of outlets arranged relative to the water-inlet means so as to cause the flow of water to said outlets in separate paths through different sections of the bed, means for normally discharging the water flowing through said outlets to service, means for causing the flow through different sections of the bed in alternation to discharge otherwise than to service, and means for introducing regenerating solution into said sections in alternation.

3. A water softener having, in combination with a single container for a bed of water softening material, of means for introducing water at a portion of the bed which causes the water to flow in separate paths through different sections of the bed to constitute said sections separate beds for the purpose of delivering softened water and for subjecting them separately to regeneration of the softening material, means for discharging the flow through certain of said bed sections to service and through the other of said bed sections to a drain, said discharging means being reversible for discharging the flow through the said certain of said sections to the drain and through the said other of said sections to service, whereby different bed sections are alternatively withdrawn from use for water softening, and means for introducing regenerating solution into different ones of said bed sections in alternation for regenerating the same when the flow through any of said sections is to the drain.

4. A water softener having, in combination with a single container for a bed of water softening material, of means for introducing water at a portion of the bed which causes the water to flow in separate paths through different sections of the bed to constitute said sections separate beds for the purpose of delivering softened water and for subjecting them to regeneration of the softening material, means for flowing water to service alternately through different sections of said bed, means for flowing regenerating solution alternately through said different bed sections to a drain, the said means including valve controlled connections whereby the respective sections are alternately subjected to the flow of regenerating solution and of water to service.

5. A water softener having, in combination with a bed of water-softening material, means for introducing water into said bed between upper and lower parts thereof, means for withdrawing the water to service from both the upper and lower ends of the bed simultaneously or from the said ends in alternation, means for discharging to a drain from either end of the bed not connected for discharge to service, and means for introducing regenerating solution into either part of the bed the flow through which is to the drain.

6. A water softener having, in combination with a bed of water-softening material means for introducing water into said bed between upper and lower parts thereof, means for withdrawing the water to service from both the upper and lower ends of the bed simultaneously or from the said ends in alternation, means for discharging to a drain from either end of the bed not connected for discharge to service, means for introducing regenerating solution into either part of the bed the flow through which is to the drain, and means for introducing water below the bed, the construction and arrangement being such that water can flow upwardly through the entire bed to service.

7. A water softener having, in combination with a bed of water-softening material, means for effecting a flow of water to service through the entire length of the bed, means for withdrawing a selected section of the bed from such flow, and means for effecting the flow of regenerating solution and water for flushing successively through such selected section to a drain.

8. A water softener having, in combination with a bed of water-softening material, valve-controlled means for introducing water to the bed at one end or at an intermediate point, valve-controlled means for discharging from either end of the bed either to service or to a drain, and means for introducing regenerating solution into the bed between the point of introducing the water and whichever end discharges to the drain.

9. A water softener having, in combination with a bed of water-softening material, valve-controlled means for introducing water to the bed either at its lower end or at an intermediate point, valve-controlled means for discharging from the upper end of the bed to service, valve-controlled means for discharging from the lower end of the bed to a drain when the water is being introduced only at said intermediate point, and means for introducing regenerating solution into the bed below the said intermediate point of introducing water.

10. A water softener having, in combination with a bed of water-softening material, means for effecting a flow of liquid through the bed in separate paths through different sections of the bed divided transversely of the direction of flow therethrough, means for deriving the entire flow from a source of water, means for deriving the flow through different sections in alternation from a source of regenerating solution or in part from such source, means for discharging the entire flow to service when the entire flow is derived from said source of water, and means for discharging the flow through different sections in alternation to a drain when the flow therethrough is alternatively derived from or in part from said source of regenerating solution.

11. A water softener comprising a single container for a bed of water-softening material having a plurality of inlets and a plurality of outlets arranged in spaced relation so that liquid will flow from said inlets to said outlets in separate paths through different sections of the bed divided transversely of the direction of flow to constitute said sections separate beds for the purpose of delivering softened water and for subjecting them to regeneration of the softening material, each of said inlets having valve-controlled connections with a source of water and a source of regenerating solution, and each of said outlets having valve-controlled connections with service and drain pipes.

12. A water softener comprising a container for a bed of water-softening material having a pair of inlets and a pair of outlets arranged in spaced relation so that liquid will simultaneously flow from both of said inlets to both of said outlets in opposite directions through upper and lower sections of the bed, a water supply pipe in connection with said inlets, a service pipe in connection with said outlets, a means for supplying regenerating solution, a drain pipe, means for connecting either outlet to the drain instead of to the service pipe, and means for connecting the corresponding inlet to the means for supplying regenerating solution.

13. A water softener comprising, in combination with a bed of water softening material, connections for flowing water in opposite directions through upper and lower sections of the bed to service, and means for effecting a backwashing of the section through which the water normally flows downward while continuing the flow of water to service through the section through which the water normally flows upward.

14. A water softener comprising a softening tank having a plurality of inlets and a plurality of outlets, supply pipes for water and regenerating solution, delivery pipes for soft water and waste liquid, each of said inlets having valve-controlled connections with both supply pipes, each of said outlets having valve-controlled connections with both delivery pipes, and the inlets and outlets being arranged for flowing liquids therebetween in separate paths through different water-softening zones of the tank, whereby said zones may be alternatively regenerated without interrupting the softening operation.

15. A water softener comprising a softening tank having a plurality of inlets and a plurality of outlets, supply pipes for water and regenerating solution, delivery pipes for soft water and waste liquid, each of said inlets having valve-controlled connections with both supply pipes, each of said outlets having valve-controlled connections with both delivery pipes, and the inlets and outlets being arranged for flowing liquids therebetween in separate paths through different water-softening zones of the tank, whereby said zones may be collectively utilized for softening and may be regenerated in alternation.

16. A water softener comprising a softening tank having a plurality of inlets and a plurality of outlets so arranged that liquid will flow from said inlets to said outlets in separate paths through different water-softening zones of the tank, supply pipes for water and regenerating solution, each of said inlets having valve-controlled connections with both of said supply pipes, and service and drain delivery pipes, each of said outlets having valve-controlled connections with both of said delivery pipes, whereby the inlets and outlets may be respectively connected with the water supply and service pipes for flowing water through the said zones simultaneously, and whereby certain of said inlets and outlets may remain connnected as aforesaid while certain other of said inlets and outlets may be respectively connected with the pipe for supplying regenerating solution and with the drain pipe for effecting a regenerating operation in certain of said zones while continuing to pass water for softening through certain other of said zones.

ANDREW J. DOTTERWEICH.